April 28, 1936. G. W. WILMOT 2,038,695
SPROCKET WHEEL
Filed Nov. 23, 1933
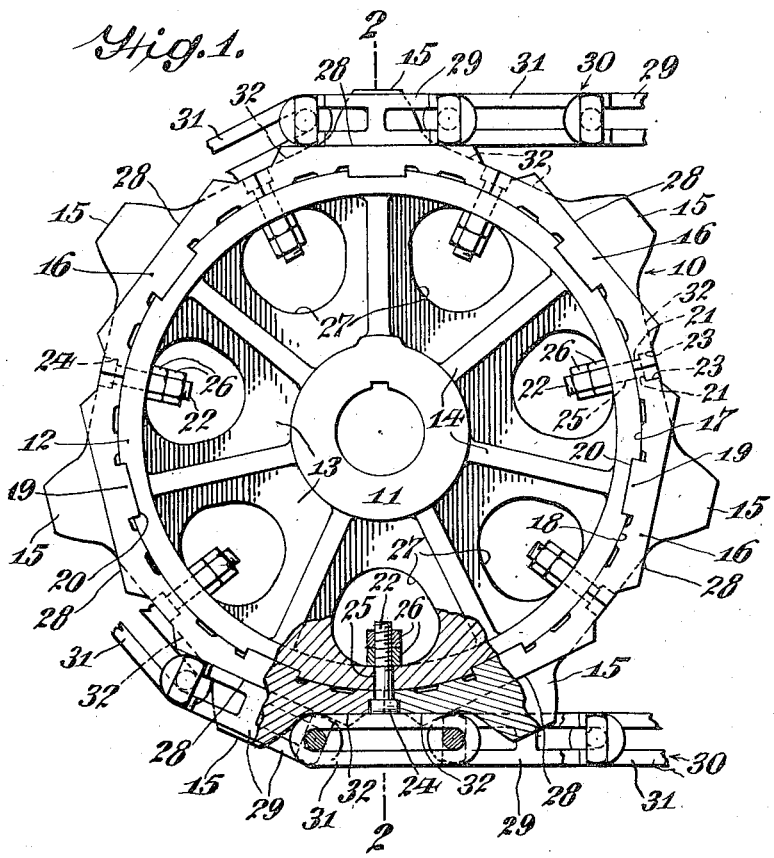
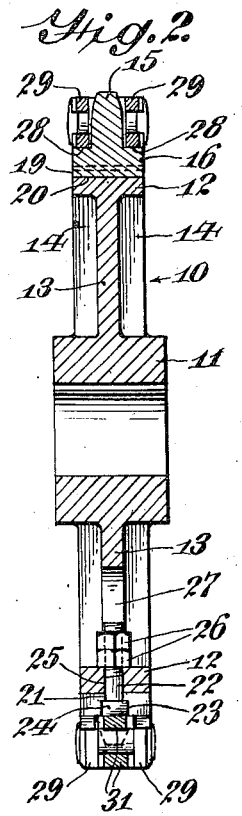
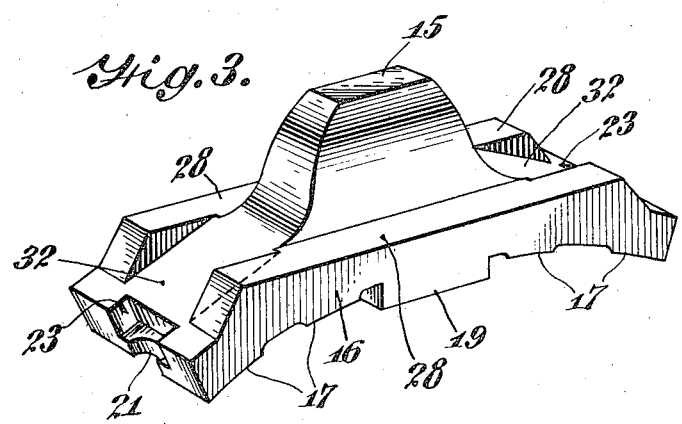
INVENTOR.
George W. Wilmot,
BY John D. Myers
ATTORNEY.

Patented Apr. 28, 1936

2,038,695

UNITED STATES PATENT OFFICE 2,038,695

SPROCKET WHEEL

George W. Wilmot, Hazleton, Pa., assignor to Wilmot Engineering Company, a corporation of Pennsylvania Application November 23, 1933, Serial No. 699,352

5 Claims. (Cl. 74—243)

The invention relates to a sprocket wheel for conveyer chains and the like and involves an improvement in a sprocket wheel structure designed to provide a support throughout the length of the side links of the sprocket chain and thereby prevent the side links from being bent or broken when subjected to excessive strain in their passage around the sprocket wheel, or when the sprocket teeth have become worn through use.

The sprocket wheel to which the improvement relates is designed primarily for use with a conveyer chain in which the center links alternate with pairs of side links, the two links of each pair of side links being spaced from each other for the purpose of providing an opening to receive the sprocket teeth therebetween. In the structures heretofore employed, means have been provided on the rim of the sprocket wheel, at the base of each tooth, to support the side links of the sprocket chain for a portion only of the length of the side links. In consequence of such a structure the ends of the side links of the chain are either unsupported, or are insufficiently supported to prevent them from being bent or broken when passing around the sprocket wheel and when the chain is subjected to undue strain. After extended use of the sprocket wheels, the edges of the teeth frequently become worn to such an extent that the relative positions of the side links with respect to the teeth change so as to provide little or no support for the ends of the side links with the result that the side links are frequently bent or broken by the transverse strain exerted thereon in the plane of the sprocket wheel when the conveyer is in use.

One of the objects of the present invention therefore is the provision on a sprocket wheel of a support for the side links of the sprocket chain throughout the length of these links. A further object is the provision of means in combination with the teeth of a sprocket wheel to prevent the side links from being bent or broken when these links are subjected to undue transverse strain in their passage around the sprocket wheel. A still further object of the invention is the provision on a sprocket wheel of a support for the ends of the side links when the position of the links on the sprocket wheel, with respect to the sprocket teeth, changes due to wear on the sprocket teeth.

Still other objects and advantages of the improvement will be apparent from the following description taken with the accompanying drawing wherein:

Fig. 1 is a side elevational view, partly in section, showing my improved sprocket wheel with a conveyor chain passing thereabout;

Fig. 2 is a sectional view taken on the line 2—2 of Fig. 1; and

Fig. 3 is a perspective view of one of the removable sprocket teeth with which I have illustrated my improvement.

I have disclosed my invention in connection with a sprocket wheel 10 having a hub 11 and a circumferential rim 12 connected thereto by means of a web 13 having spaced reinforcements 14 in radial alinement with the sprocket teeth 15. As disclosed herein, the sprocket teeth 15 are removably secured to the rim of the sprocket wheel in order that broken or worn teeth may be readily replaced. It will be understood, however, that my invention is equally applicable to other types of sprocket wheels.

As I have illustrated my invention herein, each of the sprocket teeth 15 is arranged centrally of a base member 16 the inner face 17 of which is made to conform generally to the outer face 18 of the rim 12, and is provided with means, such as a transverse rib 19, for engagement with a transverse groove 20 in the rim for preventing circumferential movement of the base with respect to the rim. Each end of the base is provided with a semi-circular notch 21 which cooperates with a similar notch in the adjoining end of the base portion of the adjacent sprocket tooth for the reception of a bolt 22 whereby the teeth may be removably secured to the rim. As shown herein, the outer end of the semi-circular notch 21 is formed with a rectangular recess 23 which cooperates with a similar recess in the end of the adjoining base portion for the reception of the square head 24 of the bolt 22. The bolts 22 pass through openings 25 in the rim and the inner ends thereof are threaded for the reception of lock nuts 26 positioned for convenience within cut-away portions 27 in the web 13 of the wheel.

The base portion 16 of each sprocket tooth 15 extends transversely on each side of the tooth proper to provide a pair of opposite shoulders 28 of such a width as to support the straight-edged side links 29 of the conveyer chain 30 throughout the thicknesses of these links. The shoulders on the base portion also extend to such a distance beyond each edge of the tooth as to provide a support throughout the length of each of the side links 29. In order that the straight-edged center links 31 of the chain may position themselves in their passage around the sprocket wheel, the opposite ends of the base portion 16 are cut away as shown at 32 to provide channels therein between the sprocket teeth for the reception of the center links.

With the structure herein described, it will be apparent that means is provided on the rim of the sprocket wheel, in combination with each sprocket tooth, for supporting the side links of the conveyer chain throughout the length of these links, but more particularly at their ends so as to prevent them from being bent or broken in their passage around the wheel. It is preferable that the length of the supports 28 be somewhat greater than the length of the side links 29 in order that the ends of the side links may be properly supported after a portion of the edges of the sprocket teeth becomes worn away so that the links are not centered with respect to the sprocket teeth. In some cases, however, it may be sufficient to provide supports for the ends only of the side links, without extending the supports throughout the length of the side links. In such a construction, it will be understood that the intermediate portions of the side links would be unsupported.

It will be noted further that, with the structure herein described, the supports for the side links of the chain do not interfere with the operation of the center links, the latter being positioned within the channels 32 in the base members during the passage of the links around the wheel. It will also be noted that the transverse pull of the center links on the cooperating side links, in the plane of the sprocket wheel, acts directly upon the supports for the side links, and thereby avoids the tendency of the opposite ends of the side links to be raised from the rim of the sprocket wheel, as in the case of the sprocket wheels heretofore used.

While I have disclosed my improvement in connection with one form of conveyer chain and sprocket wheel, it will be understood that various changes may be made therein without departing from the invention as it is covered by the appended claims.

Having thus described my invention, what I claim is:

1. A sprocket wheel structure comprising a base, a pair of spaced, parallel side link supports on said base and having the operating faces thereof in the same plane throughout their length, and a tooth projecting from said base between said supports and spaced from the ends thereof.

2. A sprocket wheel structure comprising a base, a tooth projecting from said base, and oppositely arranged, spaced shoulders projecting longitudinally from each edge of said tooth and having the operating faces thereof in the same plane throughout their length for supporting the ends of straight-edged side links of a sprocket chain.

3. In a sprocket wheel having a circumferential rim and a plurality of spaced teeth thereon, link supporting means comprising a base projecting laterally to provide shoulders on the opposite sides of each tooth for engagement with straight-edged side links of a sprocket chain and projecting longitudinally in the same plane a distance substantially equal to the length of the side links.

4. In a sprocket wheel for a conveyer chain or the like having straight-edged side links spaced for receiving a sprocket tooth therebetween and pivotally connected at their ends to straight-edged center links, a base portion projecting transversely beyond the opposite sides of each tooth and longitudinally beyond the opposite edges thereof to provide shoulders in the same plane for supporting the side links throughout their length, the opposite ends of said base portion being provided with grooves in alinement with the tooth to receive the center links.

5. In combination with a conveyer chain comprising pairs of spaced, straight-edged side links alternating with straight-edged center links having the ends pivoted between the ends of the side links, a sprocket wheel having a circumferential rim, a plurality of teeth on said rim for engaging between said side links, side link supports on the opposite sides of said teeth and having the operating faces thereof in the same plane throughout their extent, said supports extending longitudinally beyond the opposite edges of each tooth to support the side links throughout their length and to provide grooves on the opposite edges of the teeth for receiving the center links.

GEORGE W. WILMOT.